J. E. RHOADS.
METHOD OF MAKING LAMINATED STRUCTURES.
APPLICATION FILED AUG. 15, 1914.

1,140,187. Patented May 18, 1915.

Witnesses —

Inventor —
Joseph Edgar Rhoads.
by his Attorneys —
Howson & Howson

UNITED STATES PATENT OFFICE.

JOSEPH EDGAR RHOADS, OF WILMINGTON, DELAWARE.

METHOD OF MAKING LAMINATED STRUCTURES.

1,140,187.  Specification of Letters Patent.  Patented May 18, 1915.

Application filed August 15, 1914. Serial No. 856,952.

*To all whom it may concern:*

Be it known that I, JOSEPH EDGAR RHOADS, a citizen of the United States, residing in Wilmington, New Castle county, State of Delaware, have invented certain Improvements in Methods of Making Laminated Structures, of which the following is a specification.

One object of this invention is to provide a method of making a composite structure of any length, consisting of a number of layers or laminations, which shall require considerably less labor and material for its production than has hitherto been expended to manufacture the same product, and which shall result in an article of generally superior qualities.

Another object of the invention is to provide a novel succession of steps for making an elongated structure of uniform thickness, from a number of layers of variable thickness.

Figure 1:
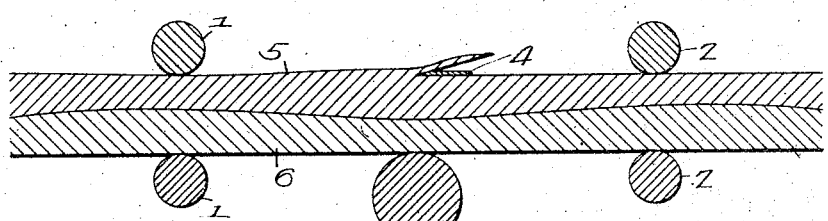
Figure 2:
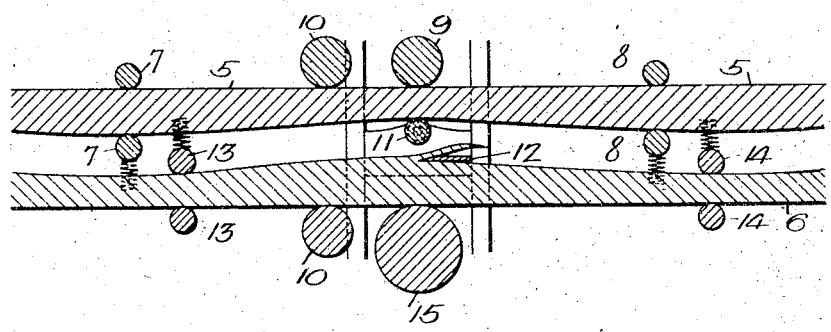

These objects and other advantageous ends I secure as hereinafter set forth, reference being had to the accompanying drawings in which;

Figures 1 and 2 are diagrammatic elevations partly in section illustrating two machines which may be employed in carrying out my invention.

In carrying out my invention I first form any desired number of single thickness lengths which in many cases would each be made of a suitable number of sheets connected together end to end, it being noted that the resulting structure is relatively flexible and varies in thickness throughout its length, although for the most part, thick portions alternate with thin portions.

Assuming that the finished structure is to consist of two layers, I lay one of the lengths made as above upon a perfectly flat surface and thereafter so fit the second length of material to it by cutting away or building up that when the two are superimposed the resulting laminated structure is of substantially uniform thickness, although there are still areas of greater or less extent in which the combined thickness of the two layers is greater than that desired in the finished product. After these two layers or lengths have been trimmed or built out so that when together they form a structure whose thickness is approximately uniform, they are separated and the lower face of the first layer is placed in contact with the top face of the upper layer, and the resulting length of material is fed through an evening machine whose elements are diagrammatically illustrated in Fig. 1. In this machine both parts of the composite or laminated structure are caused to move at the same speed by means of nip rolls 1—1 and 2—2 so that they pass between a supporting roller or other guide structure 3 and a cutter 4, such as a band knife, mounted with its cutting edge at a fixed distance from or parallel with the top surface of said guide 3; it being understood that while passing through this machine the layers 5 and 6 can not move relatively to each other. As a result all parts of the entire length of the structure 5—6 are of uniform thickness, it being noted that in this case the layer 6 is used as a gage to determine the amount of material to be cut off of the layer 5 in engagement with that face of the layer 6 which passed over the guide 3 so, or in other words, they are again joined in the same relative positions as when originally fitted together. Before so placing them together for the last time, a suitable adhesive is applied to either or both of their adjacent faces and they are permanently united by hydraulic pressure or otherwise, being also riveted or connected by other suitable means if desired.

After the first approximate fitting together of the layers 5 and 6 to make a single laminated structure, instead of reversing and trimming what had been their contacting faces I may employ a machine of the form shown in Fig. 2, whereby the layer 5 is fed by nip rolls 7—7 and 8—8 under suitable guides such as the rollers 9 and 10 and over a roll or other movable guide member 11 rigidly connected to an evening knife 12. The layer 6 is likewise fed through the machine by nip rolls 13—13 and 14—14, over the guide bar or roller 15, with its top face in position to be acted on by the cutting edge of the knife 12. Since as above noted, this knife with the gage roller 11 is free to move toward and from the two rollers 9 and 15, and since the two layers of material 5 and 6 are fed through the machine at exactly the same rate, the layer 5 will serve as a gage to move the knife 12 up or down and cause it to cut from the layer 6 just that quantity of material which must be removed in order that the combined layers shall result in a single structure of absolutely uniform thickness. Both of the layers are complementary to each other and in passing through the machine one of them serves as a gage to determine the amount to be removed from the other at any point in order that together they may form a single structure of uniform thickness throughout its length and breadth. After leaving the machine shown in Fig. 2 the two layers of material are permanently united by cement or otherwise to form the complete elongated laminated structure.

Instead of first trimming or fitting and then accurately evening the two surfaces which are ultimately to be united by adhesive, I may in some cases approximately fit together the two layers of material by trimming their adjacent faces, and then take the final or evening cut from the outside surface of one of them, by passing them through an evening machine such as is indicated in Fig. 1. In this case there would be no necessity for reversing the two layers although as before, one of them would serve as a gage to determine the amount of material to be trimmed from the other before they were permanently united to form a single structure of uniform thickness.

I claim:

1. The method of making a laminated structure which consists in loosely superimposing a plurality of layers of material; trimming the same while superimposed to cause the combined thickness of said layers to be accurately uniform throughout the length thereof; and thereafter permanently uniting said layers to form a single composite structure.

2. The method of making a laminated structure which consists in loosely superimposing a plurality of layers of material; trimming one of said layers while superimposed to cause the combined thickness of the several layers to be uniform throughout the length thereof; and thereafter permanently uniting said layers to form a single composite structure.

3. The method of making a laminated structure which consists in approximately fitting together a plurality of layers of material of varying thickness to form a loose laminated structure of substantially uniform thickness when said layers are superimposed; trimming said structure to make it accurately uniform in thickness; and thereafter permanently uniting the layers to form a single composite structure.

4. The method of making a laminated structure which consists in approximately fitting together a plurality of layers of material to make their combined thickness substantially uniform; reversing said layers to bring their outside surfaces into engagement; operating on the layers to make the combined thickness of said layers accurately uniform; reversing said layers to restore them to their original relative positions; and permanently uniting the layers.

5. The method of making a laminated structure which consists in approximately fitting together a plurality of layers of material to form a loose laminated structure of substantially uniform thickness; cutting from one of said layers an amount automatically determined by the remainder of said structure to make their combined thicknesses accurately uniform; and thereafter permanently uniting said layers.

6. The method of making a laminated structure which consists in approximately fitting together a plurality of layers of material to make their combined thickness substantially uniform; reversing said layers to bring their outside surfaces into engagement; trimming one of the layers to make the combined thickness of said layers accurately uniform; reversing said layers to restore them to their original relative positions; and permanently uniting the layers.

In testimony whereof, I have signed my name to this specification, in the presence of two subscribing witnesses.

JOSEPH EDGAR RHOADS.

Witnesses:
WILLIAM E. BRADLEY,
JOS. H. KLEIN.